No. 613,547. Patented Nov. 1, 1898.
T. WRIGHT.
DUMPING WAGON.
(Application filed June 22, 1898.)
(No Model.)

WITNESSES:
Wm L. Patton
J. W. Banaford

INVENTOR
T. Wright
BY
ATTORNEYS.

UNITED STATES PATENT OFFICE.

THOMAS WRIGHT, OF JERSEY CITY, NEW JERSEY.

DUMPING-WAGON.

SPECIFICATION forming part of Letters Patent No. 613,547, dated November 1, 1898.

Application filed June 22, 1898. Serial No. 684,174. (No model.)

*To all whom it may concern:*

Be it known that I, THOMAS WRIGHT, of Jersey City, in the county of Hudson and State of New Jersey, have invented certain new and useful Improvements in Dumping-Wagons, of which the following is a full, clear, and exact description.

This invention relates to wagons employed for hauling brick, coal, or other material which is dumped at the rear end of the vehicle.

The object of the invention is to provide novel details of construction for such a wagon which will greatly facilitate the unloading of the vehicle and which will secure springs in place thereon in a way that will permit free resilient movement of the same, and, furthermore, to provide simple means for strengthening the sill-frame of the wagon-body where it sustains the greatest strain, and also to furnish novel means for guiding the body to place on the sill-frame when said body has been rocked to dump a load therefrom.

The invention consists in the novel construction and combination of parts, as is hereinafter described, and defined in the appended claims.

Reference is to be had to the accompanying drawings, forming a part of this specification, in which similar characters of reference indicate corresponding parts in all the figures.

Figure 1:
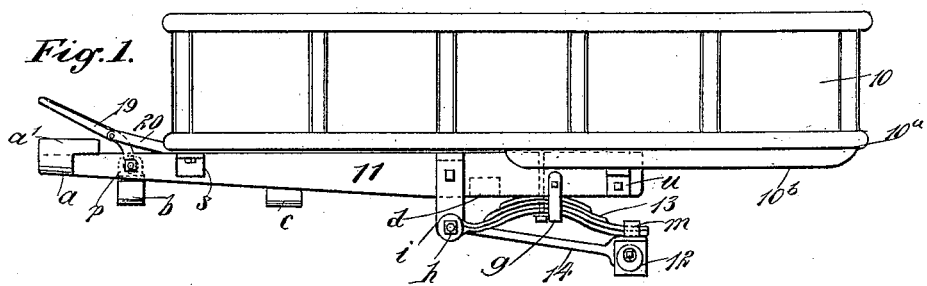
Figure 2:
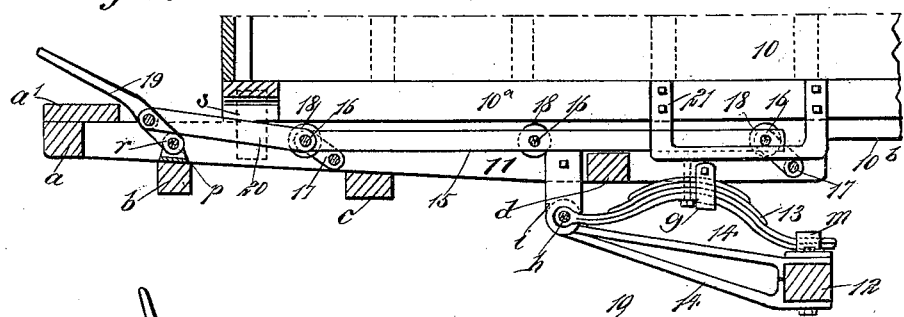
Figure 3:
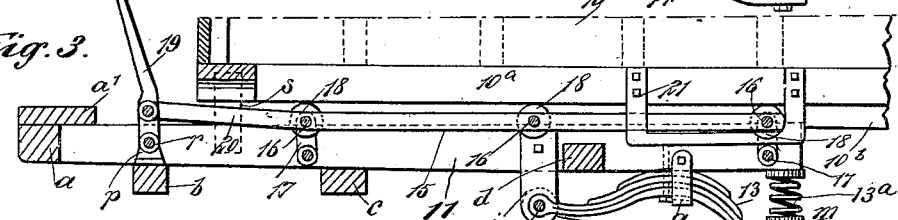
Figure 4:
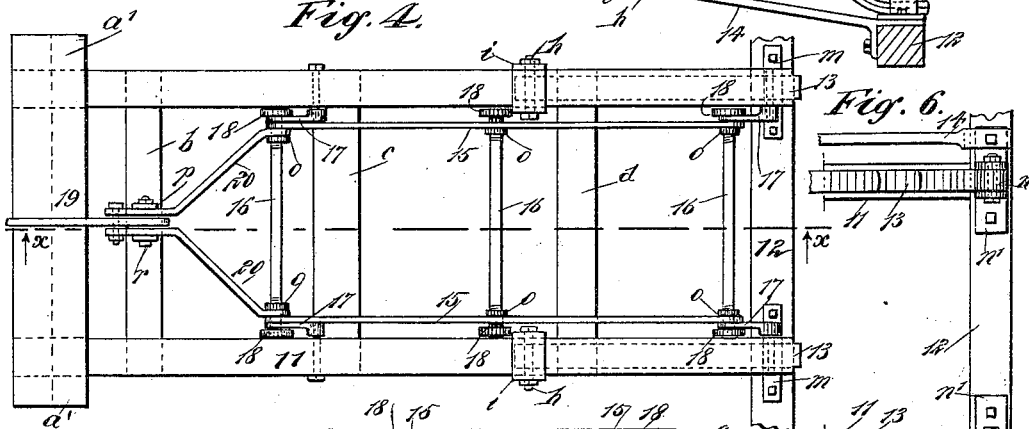
Figure 6:
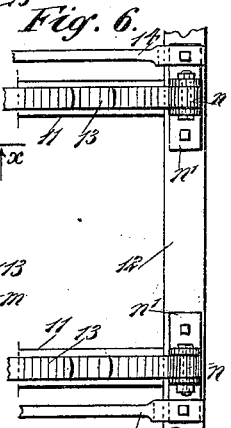
Figure 5:
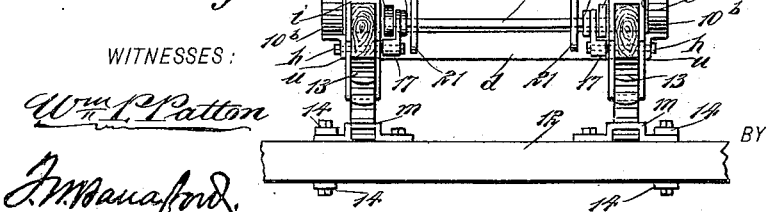

Figure 1 is a side view of a wagon-body and gear-frame having the improvements thereon. Fig. 2 is a partial sectional side elevation of the wagon-body, the gear-frame supporting the body, and the improvements in place on the gear-frame and adjusted to seat the body on said frame. Fig. 3 is a similar view, but showing the working details adjusted to elevate the wagon-body from the gear-frame, the line of section for both Figs. 2 and 3 being substantially indicated at $x$ $x$ in Fig. 4. Fig. 4 is a plan view of the gear-frame and of the improvements thereon, the body being removed. Fig. 5 is a rear end view of the sill-frame of the body, the gear-frame whereon the sill-frame rests, and novel details carried by said frames; and Fig. 6 is a plan view of the rear portion of the gear-frame and of features of the improvement thereon, showing certain details slightly modified in construction.

The details of improvement are well adapted for service on either a four-wheeled freight-wagon or a two-wheeled cart. In the drawings the improvements are shown in connec-with a wagon-body, the wheels of the wagon being omitted as not essential to illustrate the invention.

The body 10 of the wagon is an elongated rectangular structure the sill-frame $10^a$ of which is of such relative dimensions as will adapt it to be seated upon the gear-frame 11 and extend at each side of the gear-frame, as well as at the rear end beyond said gear-frame. As shown, the gear-frame is formed of two side beams held spaced apart in parallel planes by cross-bars $a$, $b$, $c$, and $d$ and by the footboard $a'$, secured upon the front end of the gear-frame, above the cross-bar $a$.

The front portion of the gear-frame is to be sustained by a forward set of wheels, the usual axle, and a fifth-wheel structure or its equivalent, on which the cross-bars $b$ $c$ may be imposed and secured, and as there is nothing new in these details they are not shown.

The rear axle 12 is connected loosely at points below the side beams of the gear-frame 11 to the rear ends of two arched plate-springs 13 by means which will presently be described, and each spring is loosely hung near its longitudinal center from a respective side beam of said frame by a looped hanger $g$, bolted at its ends upon the beam, thus adapting each spring in service to move endwise a limited degree.

A scroll formation or transverse eye is produced on the forward end of each spring 13, which eyes receive pivot-bolts $h$, that engage with the transversely-perforated lower portions of depending looped brackets $i$, respectively bolted upon the side beams of the gear-frame 11. A diagonal brace-rod 14, or, if preferred, two of such brace-bars, are extended from the pivot-bolt $h$ at each spring-eye to the rear axle 12, whereon the rear ends of said braces are secured by bolts or other means.

The rear ends of the springs 13, which are loosely sustained in place on the rear axle 12, may be held thereon by two clip-plates $m$, one clip-plate for the end of each spring, said plates being adapted to loosely embrace the projecting flat portions of the springs near their rear extremities and also to be secured upon the axle, as best shown in Fig. 5.

In Fig. 6 a modified means for loosely connecting the rear ends of the springs 13 with the rear axle 12 is shown. In this construction an eye $n$ is produced on each spring at its rear extremity, and said eyes $n$ are received between the upright parallel jaws of like bracket-stands $n'$, to which they are secured by pivot-bolts.

The described construction for loosely connecting the springs 13 with the axle 12 and gear-frame 11 adapts said springs for free resilient action and also enables their removal with ease in case repair is needed.

An important feature of improvement shown consists in novel means for raising the sill-frame $10^a$ of the body 10 from the top of the gear-frame 11 and in providing rollers for the free longitudinal rearward movement of the body a suitable distance when a load is to be dumped from the tail end of the body.

The body 10 normally rests upon the gear-frame 11 and is so positioned thereon that the major portion of the load strain will be disposed over the gear-frame, only about one-third of the length of the body when seated on the gear-frame extending beyond the rear end of the latter.

The body-raising mechanism is very simple and efficient in service and consists, essentially, of the following details: Two carrier-bars 15 are provided, having an equal length, which is preferably two-thirds the length of the gear-frame 11. The carrier-bars 15 are perforated oppositely near their ends and also near their longitudinal centers for the reception of the cylindric ends of three transverse shafts 16, and the carrier-bars are spaced apart on said shafts by collar-nuts $o$, that are adjustable on the shafts.

Two pairs of rock-arms 17 are furnished for the support of the carrier-bars 15, and the lower ends of said arms are pivotally secured upon the inner faces of the side beams of the gear-frame 11, one pair of rock-arms being located oppositely near the rear end of the gear-frame and the other pair of the rock-arms at a suitable distance therefrom toward the front end of said gear-frame.

The outer ends of each pair of rock-arms 17 are respectively pivoted upon the projecting outer end portions of the shafts 16, so that said arms will have a loose contact with the outer sides of the carrier-bars 15. On the ends of the transverse shafts 16 which project beyond the engaged ends of the rock-arms 17 rollers 18 are mounted and are held on the shaft by any suitable means, so that the rollers may rotate with the shafts or upon them, as may be preferred.

Rollers 18 are mounted on the outer ends of the intermediate shafts 16, of an equal diameter to those on the other two shafts, and for efficiency in service the two pairs of rock-arms should be arranged so as to all be adapted to receive adjustment together and stand vertically or be forwardly inclined the same degree from a vertical plane.

On the cross-bar $b$ of the gear-frame 11 a bracket-stand $p$ is secured near the transverse center thereof, said bracket-stand being pivotally connected at $r$ to the lower end of a lever 19, which is thus supported to rock toward the front or rear of the gear-frame.

On the lever 19 the forward ends of two similar link-bars 20 are oppositely pivoted by the same bolt $r'$ and are thence laterally and rearwardly extended to have a pivotal engagement with the front transverse shaft 16 at the inner sides of the carrier-bars 15, as clearly shown in Fig. 4.

As the link-bars 20 are pivoted upon the lever 19, above the fulcrum-bolt of the latter, it will be seen that a forward rocking movement of said lever will incline the rock-arms 17 forwardly and depress the rollers 18, so that they will not touch the sill-frame $10^a$ of the body 10, this adjustment being represented in Fig. 2 of the drawings.

If it is required that the body 10 be raised from the gear-frame 11 and be moved rearwardly to dump a load, this can readily be accomplished by simply rocking the lever 19 rearwardly a proper degree, which will raise the rock-arms 17 into an upright position and along with them the carrier-bars 15 and shafts 16, so that the rollers 18 will press upwardly upon the sill-frame $10^a$ sufficiently to remove it from the gear-frame 11. On the inner sides of the two longitudinal portions of the sill-frame $10^a$ a check-loop frame 21 is secured to each of said parts, as is clearly shown in Figs. 2, 3, and 5.

The check-loop frames 21 consist of an essentially U-shaped flat bar the upright members of which are held spaced apart at their lower ends by an integral straight member which is at right angles to the upright members. The check-loop frames 21 are oppositely secured on the sill frame $10^a$, so that considerable portions of their upright members will project below said sill-frame, and thus dispose the horizontal members thereof below the rear transverse shaft 16.

From the positions given to the check-loop frames 21 their rear upright members will normally be adjacent to the rear shaft 16, which will define the forward movement of the body 10 on the gear-frame 11 by the impinge of the said upright members on said transverse shaft. A sufficient length is afforded the check-loop frames 21 to permit a rearward movement of the body 10 on the gear-frame 11, so that the weight of a load in the body will preponderate slightly at the rear of the gear-frame, and thus cause the body to tip downwardly when it is given full travel rearward, such movement being limited by the contact of the front upright members of the check-loop frames 21 with the front of the rear transverse shaft 16.

The sill-frame $10^a$ of the body 10 as ordinarily constructed is too light to withstand the severe shocks sustained by it when the body is tilted rearward and said frame forcibly strikes against the ground, so that the body of a coal or brick hauling wagon is soon injured by the rough service it undergoes.

To strengthen the rear portion of the sill-frame 10ª, I provide reinforce frame-bars 10ᵇ, which are firmly secured upon the lower side of the sill-frame, along the side beams thereof, said reinforce-bars being extended forwardly a suitable length from the rear ends of the side beams on the outer portions of the sill-frame, as shown in Fig. 5.

It will be seen that the addition of the reinforcing-pieces 10ᵇ to the sill-frame 10ª will counteract the ill effects of percussion sustained by said frame at the rear end of the body, and thus conduce to the durability of the body 10. On opposite sides of the portions of the sill-frame 10ª that extend beyond the gear-frame 11 and near the front end of the sill-frame the horizontal members of two similar angle-plates $s$ are secured, this attachment of parts serving to locate the depending member of each angle-plate in loose contact with the outer side surface of each side beam of the gear-frame 11 when the sill-frame is imposed on the gear-frame, one of said angle-plates being shown in full lines in Fig. 1 and in dotted lines in Figs. 2 and 3.

Near the rear end of the gear-frame 11 two similar right-angular brackets $u$ are oppositely secured upon the side beams of the same, so that the horizontal outwardly-projecting flanges of the brackets will become supports for the reinforcing-pieces 10ᵇ, that rest thereon when the body 10 is in contact with the gear-frame, and it will be apparent that the brackets $u$ will serve as fulcrums when the body 10 is to be tilted rearwardly.

In case a wagon having the improvements is designed to carry a very heavy load it is found desirable to provide an auxiliary spring 13ª for each arched plate-spring 13. The auxiliary springs 13ª consist of a strong coil of elastic steel or other metal and seated in a cup or other base on the top of a respective clip-plate $m$, the upper end of each coiled spring being held in place beneath and in contact with a rear corner of the gear-frame 11, as indicated in Fig. 3.

It will be seen that by the provision of the supplementary springs 13ª, which may be made removable at any time it is desired, such springs may be introduced to aid the plate-springs 13 and prevent excessive strain thereon.

In service the forward end of the wagon-body will be held from lateral displacement by the angle-plates $s$, which will also serve to guide the body into place on the gear-frame when a load has been dumped and the body is being restored to a level position on the gear-frame.

From the foregoing description it will be seen that an operator by manipulation of the lever 19 may with but little exertion raise the loaded body 10 upon the rollers 18, and thus facilitate the longitudinal movement of the body toward the rear end of the gear-frame 11, and if the tail-board of the body has been removed the arrest of travel of the body by the impinge of the check-loop frames 21 on the rearmost cross-shaft 16 will cause the body to tilt and thus dump the load.

Having thus described my invention, I claim as new and desire to secure by Letters Patent—

1. The combination of the gear-frame, the movable body adapted to rest thereon, transverse shafts movable toward and from the gear-frame at different points thereof, a longitudinal connection between the shafts to cause them to move in unison, and rollers located upon said shafts and adapted to engage the body, substantially as described.

2. The combination of the gear-frame, the movable body adapted to rest thereon, arms pivoted to the gear-frame to swing in vertical planes, transverse shafts connecting said arms at a distance from their pivots, rollers located upon said shafts and adapted to engage the body, and longitudinal bars connecting the several transverse shafts to cause them to move in unison, substantially as described.

3. The combination with the sill-frame of a wagon-body, and a gear-frame whereon the sill-frame is normally seated, of a plurality of rock-arms pivoted on the side beams of the gear-frame, carrier-bars held in parallel planes by transverse shafts passing through the carrier-bars and also through the ends of the rock-arms, rollers on the outer ends of the transverse shafts, and means for raising the rock-arms to press the rollers upon the sill-frame and adapt the sill-frame to roll thereon, as described.

4. The combination with a sill-frame of a wagon-body, and a gear-frame whereon the sill-frame is normally seated, of a plurality of rock-arms pivoted on the side beams of the gear-frame, carrier-bars held spaced apart in parallel planes by transverse shafts, and collars on said shafts which engage with the inner sides of the carrier-bars, the ends of the shafts passing loosely through the carrier-bars and also through the outer ends of the rock-arms, rollers mounted on the ends of the transverse shafts, and an upright lever held to rock on the forward part of the gear-frame, and connected by links with the forward transverse shaft so as to raise or lower the rollers when the lever is rocked, as described.

5. In a dump-wagon, the combination with the sill-frame of the body, and reinforcing-strips thereon near its rear end, of a gear-frame which supports the sill-frame, depending angle-plates on the front end of the sill-frame, adapted to guide said frame into place on the gear-frame, and brackets on the rear of the gear-frame whereon the reinforcing-strips of the sill-frame rest, as described.

6. In a dump-wagon, the combination with a sill-frame of the body, of a gear-frame, a rear axle, two arched plate-springs held loosely on the gear-frame near their longitudinal centers, and pivoted at their front ends upon hangers that depend from said gear-frame, means to loosely hold the rear ends of the springs upon the upper side of the rear axle, and braces held by their forward ends on the pivot-bolts of the springs, said braces being rearwardly extended and secured upon the rear axle, as described.

7. In a dump-wagon, the combination with a gear-frame, and a rear axle, of two arched plate-springs loosely connected at their front ends to the gear-frame, and upon the rear axle by their rear ends, and an auxiliary coiled spring mounted upon the rear axle near the rear end of each plate-spring and having a bearing upon the rear portion of the gear-frame, as described.

8. In a wagon or carriage, the combination with the frame and the rear axle, of an upwardly-arched spring whose front end is pivoted to the frame in advance of the rear axle, while the rear end of the spring has a sliding connection with the rear axle, and the central raised portion of the spring is in sliding engagement with the frame.

THOMAS WRIGHT.

Witnesses:
JNO. M. RITTER,
WM. P. PATTON.